3,437,656
**PROCESS FOR THE PREPARATION OF
α-AMINO-ω-LACTAMS**
Winfried J. W. Vermijs and Johan P. H. Von den Hoff, Geleen, Netherlands, assignors to Stamicarbon N.V., Heerlen, Netherlands
No Drawing. Filed Aug. 5, 1966, Ser. No. 570,439
Claims priority, application Netherlands, Aug. 13, 1965, 6510583
Int. Cl. C07d *41/06*
U.S. Cl. 260—239.3          3 Claims

---

ABSTRACT OF THE DISCLOSURE

A process for the catalytic hydrogenation of α-nitro-ω-lactams, using a Raney nickel catalyst, is described, for the preparation of α-amino-ω-lactams. The process includes the feature that the Raney nickel catalyst is separated from the liquid phase reaction under hydrogen pressure, so that catalyst losses are minimized.

---

The invention relates to and provides an improved process for the preparation of α-amino-ω-lactams by catalytic hydrogenation of water-soluble salts of the aci-form of the corresponding α-nitro-ω-lactams, followed by separation of the catalyst mass and reaction liquid after the hydrogenation.

By this method, which is described in U.S. patent specification 3,052,670, a high yield of α-amino-ω-lactams can be obtained from the corresponding nitro-lactams, using hydrogenation catalysts such as catalysts of the Raney-nickel type. The catalysts employed in this process are fairly expensive. In order that the process can be practiced in an economic way, it is essential therefore not only that the conversion efficiency be high, but also that the catalyst consumption be sufficiently low.

We have observed, however, that in the presently known methods of practicing the process, considerable catalyst losses occur, mainly due to the fact that during separation of catalyst mass from reaction mixture, a significant amount of the catalyst dissolves in the reaction liquid.

The present invention provides an improved procedure wherein a high conversion efficiency of the reaction is combined with a low catalyst consumption.

This new procedure is characterized by conducting the separation of the catalyst mass from the reaction liquid under hydrogen pressure, and reusing the thus isolated catalyst mass for a subsequent hydrogenation of an additional lot of the starting material.

The hydrogen pressure which is maintained during the isolation of the catalyst mass from the reaction liquid need not be equal to that used in the hydrogenation. Any hydrogen pressure is suitable.

Isolating the catalyst mass under hydrogen pressure may be done in many ways, for instance, the catalyst mass may simply be separated off, for example, in a filtering apparatus which is kept under hydrogen pressure. Alternatively, the reaction mixture under hydrogen pressure may be passed through a hydrocyclone. Preferably, however, this isolation is carried out by allowing the catalyst mass to settle under hydrogen pressure in the reaction liquid, and withdrawing, as by syphon or decantation, the catalyst-poor supernatant reaction liquid. It has been found that the catalyst mass settles so effectively in reaction liquid that only a negligible amount of catalyst is withdrawn from the reactor in this method. Upon withdrawal of catalyst-poor reaction liquid, there will remain a catalyst-rich suspension in the reactor, and it has been found that this suspension is entirely suitable for use in the hydrogenation of additional starting material in a subsequent hydrogenation.

In separating the catalyst mass from the reaction liquid, it was found that, contrary to expectation, the settling rate of the catalyst mass under hydrogen pressure increases as more catalyst is present in the reaction liquid. Therefore, it is preferred to carry out the process according to the invention with a reaction mixture containing at least 10 g. of catalyst per litre of reaction liquid calculated on the volume of reaction liquid after the hydrogenation. The use of such a high catalyst concentration proves to have no adverse effect on the catalyst consumption, and moreover has the advantage that the hydrogenation proceeds at a faster rate, so that, under otherwise identical conditions, the hydrogenation can be carried out in a smaller reactor.

Application of the process according to the invention enables a given catalyst mass to be used many times, with preservation of a sufficiently high hydrogenation rate and a high conversion efficiency, while only a slight amount of catalyst need be supplied to compensate for catalyst losses caused by dissolution of catalyst in the reaction medium and by entrainment of catalyst particles from the reaction system by withdrawn reaction liquid.

The process according to the invention will be elucidated further in the following example without, however, being restricted thereto in any way whatsoever.

EXAMPLE 150 l. of water and 7.5 kg. of Raney nickel were fed to a 600 l. autoclave provided with a powerful turbine agitator. Next, a hydrogen-nitrogen mixture (85 parts of hydrogen to 15 parts of nitrogen) was passed through the liquid in the autoclave, and the pressure in the autoclave was adjusted at 20 atmospheres by means of a vent valve. This being done, the agitator was started and the catalyst suspension heated to approximately 85° C. After that, a solution of 90 kg. of α-nitro-ω-caprolactam in 220 kg. of aqueous ammonia (concentration: 5% by weight) was pumped into the autoclave within 1 hour. Ten minutes after the addition of the total amount of nitrolactam solution, substantially complete hydrogenation proved to have taken place and the agitator was stopped. The Raney nickel was separated from the reaction liquid by allowing it to settle in the autoclave whilst maintaining the hydrogen pressure but without passing hydrogen through the reaction mixture. Thirty minutes after the agitator has been stopped, the Raney nickel proved to have sufficiently settled, and so much catalyst-poor reaction liquid was withdrawn from the reactor that 150 l. of liquid and catalyst mass settled in it remained in the autoclave. The withdrawn reaction liquid was treated further in the known manner. The liquid with Raney-nickel mass left in the reactor was used in a subsequent hydrogenation.

To that end the agitator was restarted and an equal amount of α-nitro-ω-caprolactam was hydrogenated in the manner described above, whereafter reaction liquid was separated from the catalyst. During all operations the temperature in the autoclave was kept at approximately 85° C.

In this way many charges of α-nitro-ω-caprolactam were hydrogenated in succession. In order that a sufficiently high hydrogenated rate could be maintained, 2 kg. of fresh Raney nickel was added after every 10 charges.

The comparative example given below demonstrates that the catalyst consumption is much higher if the separation of the catalyst mass is not carried out under hydrogen pressure.

COMPARATIVE EXAMPLE

Instead of allowing the Raney nickel to settle under hydrogen pressure, the entire reaction mixture was withdrawn from the autoclave and passed through a filter after hydrogenation of each charge.

The Raney-nickel mass recovered by filtration was returned into the autoclave to be used for hydrogenation of a following charge of α-nitro-ω-caprolactam. At the same time, approximately 150 l. of water were fed to the autoclave. The other conditions were kept equal to those described in the example.

After every charge, it proved necessary to supply 1 kg. of fresh Raney nickel in order that the same average hydrogenation rate could be achieved as in the example given above.

It will be appreciated that the practice of this invention may thus be effected in various cases, as limited solely by the spirit and scope of the following claims.

What is claimed is:

1. In the liquid phase process for the manufacture of α-amino-ω-lactams by the Raney nickel catalytic hydrogenation of water-soluble salts of the aci-form of the corresponding α-nitro-ω-lactams, and subsequently separating the catalyst mass from the reaction liquid after the hydrogenation, the improvement consisting essentially in separating the catalyst mass from the reaction liquid while maintaining hydrogen pressure thereover and reusing the isolated catalyst mass for the hydrogenation of additional α-nitro-ω-lactam starting material.

2. The improved process according to claim 1, wherein the catalyst mass is allowed to settle in the reaction liquid under hydrogen pressure and catalyst-poor supernatant reaction liquid is withdrawn under hydrogen pressure.

3. The improved process according to claim 2, wherein the hydrogenation is carried out with a reaction mixture containing at least 10 g. of catalyst per litre of reaction liquid, calculated on the volume of reaction liquid after hydrogenation.

References Cited

UNITED STATES PATENTS

| 2,472,427 | 6/1949 | Johnson | 252—472 |
| 2,857,337 | 10/1958 | Hamilton et al. | 252—472 |
| 3,048,580 | 8/1962 | Ottenheym et al. | 260—239.3 |
| 3,052,670 | 9/1962 | Ottenheym et. al. | 260—239.3 |
| 3,317,516 | 5/1967 | Mifune et al. | 260—239.3 |

HENRY R. JILES, *Primary Examiner.*

R. J. BOND, *Assistant Examiner.*